Oct. 5, 1943.  W. LEATHERS  2,330,980
METER READING APPARATUS
Original Filed Aug. 2, 1940
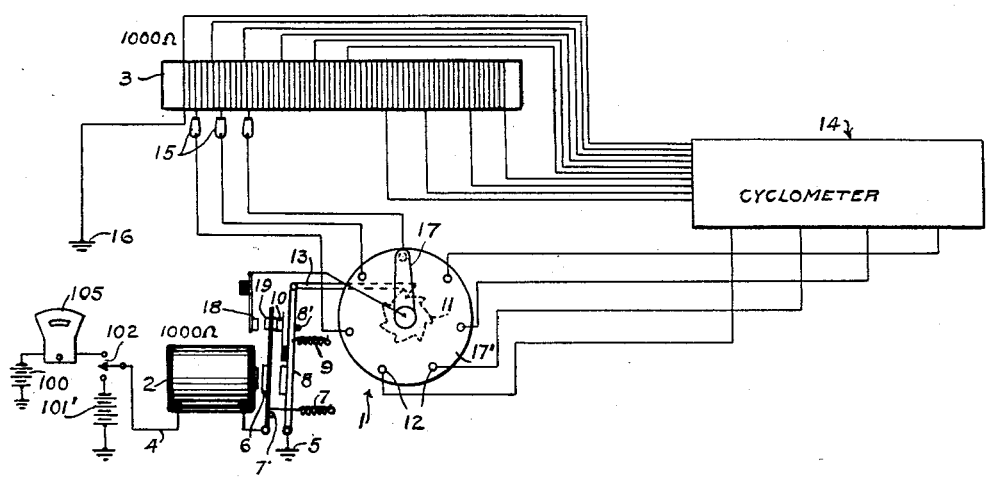
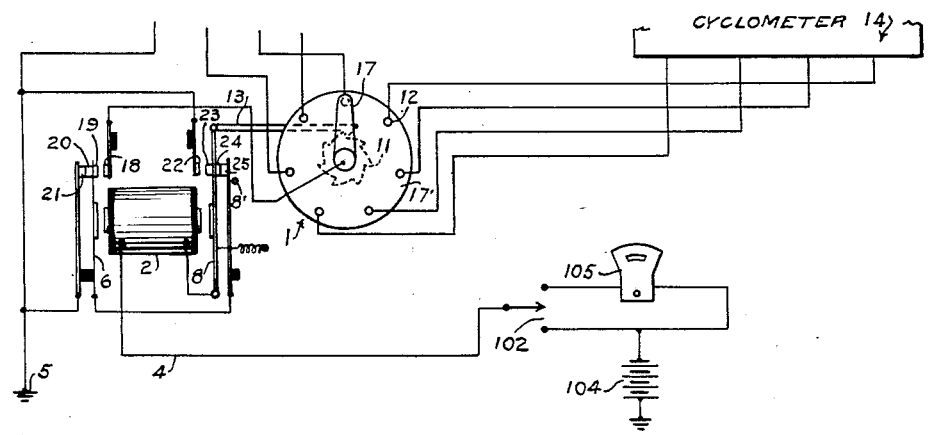
INVENTOR:
Ward Leathers.
BY
W. M. Wilson
ATTORNEY Patented Oct. 5, 1943

2,330,980

UNITED STATES PATENT OFFICE 2,330,980

METER READING APPARATUS

Ward Leathers, Brooklyn, N. Y., assignor to International Business Machines Corporation, New York, N. Y., a corporation of New York Original application August 2, 1940, Serial No. 349,980. Divided and this application August 12, 1942, Serial No. 454,489

2 Claims. (Cl. 177—351)

This application is a division of my U. S. Patent No. 2,295,533, dated September 15th, 1942, for Meter reading apparatus.

The present invention has to do with reading of consumer meters, such as those for the recording of consumed units of electricity, gas, water, steam, etc. It is related to the group of devices which read these widely distributed meters from a central reading station by means of a wire. The portions of the wire reading system found at the reading or central station end are neither shown nor described in this specification but may be clearly understood by reference to a copending application for Letters Patent Serial No. 331,814, filed April 26, 1940, for Accounting apparatus, by Ward Leathers and Archibald Gold.

The present invention concerns itself with the two-way function of pulse and read whereby a step-by-step pulse action permits the reading circuit to be successively joined by periodic indexing operations to various values of resistances representing a multiplicity of digits to be read one at a time and alternately or in-between the indexing operations permits the said reading without electrical interference on the part of the pulsing or indexing mechanism.

In the copending application for Letters Patent above referred to, the pulse and read functions have been maintained independent of each other by means of a time delay obtained in the pulsing mechanism during which period of time required for deenergizing the electro-magnet used for pulsing purposes, the magnet circuit is broken and the reading circuit established. The present invention concerns itself with these functions but they are obtained by other means than those referred to.

The object of the present invention is the same as that of the aforementioned copending application for Letters Patent, namely, to read digits indicative of the identifying number of the meter and other digits representing the recorded consumption of the meter but to accomplish the same by means of a similar pulse and read cycle but without the time factor just referred to.

In carrying out the above mentioned objects, the invention contemplates the provision of a common circuit for both the pulsing and reading functions and having associated therewith an indexing solenoid which serves the dual purpose of both performing the necessary indexing operation whereby the various values of resistances are potentially established in the circuit for subsequent reading, and of thereafter closing the circuit through the reading device or instrumentality to render the reading previously set up at the time the indexing operation was performed. Actuation of the solenoid to selectively perform its independent dual functions is effected by energizing the circuit in succession with current of different voltages.

Other modifications of the invention wherein current of varying characteristics are alternately applied to the circuit for performing the pulsing and reading functions respectively are contemplated, as will appear presently.

In the accompanying drawing forming part of this application, certain embodiments of the invention have been disclosed for illustrative purposes. In the drawing:

Fig. 1 is a semi-schematic electric diagrammatic view showing one form of a means for reading meter indices by a pulse and read device constructed in accordance with the principles of the present invention.

Fig. 2 is a diagrammatic view, similar to Fig. 1, showing a modified form of the invention.

In the meter to be read, ten resistances having progressively increasing values correspond respectively to the numerals 1, 2, 3, 4, 5, 6, 7, 8, 9, 0. In order to identify a meter by three digits and read a registered figure of four digits, seven numerals must be read. These numerals in the present system are read separately by means of a remotely controlled step-switch or selector switch, generally characterized by the numeral 1, Fig. 1, disposed in or near the meter which successively connects seven resistances in the reading circuit for reading at the central station, one at a time. This switch is actuated by means of an electromagnet 2. It is desirable to energize the coil of the magnet 2 and to read the values of selected resistances at 3 over the same long line 4 from a central reading station, and a ground 5. When reading the value of a resistance at 3, it is possible to have the relay coil 2 entirely out of the circuit, but this can be accomplished only by delayed deenergizing of the coil, during which time-interval the reading function of one numeral is performed, as fully set forth in the copending application above referred to. In the present invention, the coil of the magnet 2 is related to the circuit in such manner that its presence interferes least with the reading function. Likewise, the resistances are related to the circuit in such manner that the effect on the pulse function is minimized, i. e., the functions of pulse and read are substantially isolated from each other. By means of two armatures 6 and 8 of the magnet 2, the reading and pulsing may be done over the same wire without interference from the other. The armature 6, held in position by a light spring 7, makes contact by means of contact 10 with the heavier armature 8 held in position against a stop 8' by a heavier spring 9. Thus, in the normal resting position of the armatures, as shown, a circuit is complete from the central station over the long wire 4, through the coil of the magnet 2, the armature 6, contact 10, armature 8, and ground at 5. From this position the selector switch 1 may be advanced one step by sending current of sufficient voltage through the circuit just traced to attract both armature 6 and armature 8. Armature 8 advances a switch arm 17 forming part of the selector switch 17' from contact to contact, as at 12, by means of a ratchet 11 and a pulling arm 13. Four values of resistance are tapped off of the resistor 3 by means of a cyclometer 14, which registers units of a consumed commodity. Small clips 15 tap three values of resistance off of the resistor 3 for purposes of meter identification. The seven resistances are connected to the seven contacts 12 on the switch 1. The common wire of all the resistances is grounded at 16. The switch arm 17 is joined by an electrical conductor to a contact 18 which cooperates with a contact 19 on armature 6 when that armature is attracted by the relay 2. The reading is done by sending current through the coil of the magnet 2 of voltage that is insufficient to attract armature 8 yet has enough energy to attract armature 6. This is accomplished by reducing the actuating voltage as by batteries 100 and 101'. With only armature 6 attracted, the reading circuit is complete from the central reading station through the long line 4, the relay 2, armature 6, contacts 18 and 19, the arm 17, the contact 12, the cyclometer 14, part or all of the resistor 3, to ground 16. Even with the highest reading resistance in the circuit, the magnet 2 will have enough power to attract armature 6 which does not do any heavy work and is held in position by a very light spring 7 or gravity, if desired. Reading of resistance values in resistor 3 is accomplished with the coil of the magnet 2 in series; pulsing is accomplished with no other resistance in the circuit. Thus, the alternating of two D. C. voltages at the reading source enables the operator to progressively read the seven numerals in the meter by the method referred to in my copending application. The source or sources of energy for pulsing and reading may be arranged as desired. Suitable arrangements are as follows: Battery 100 of one voltage and 101' of another drawn upon selectively and alternately by means of the switch 102. Or one battery 104 (or other D. C. source) may be used selectively and alternately, by means of switch 102, through the reading volt-meter 105 or around the volt-meter.

A modification of the method just explained consists of having the two armatures on either end of the relay 2, as shown in Fig. 2. The method of operation is the same as in Fig. 1. A high voltage applied at the central reading station will cause the magnet 2 to attract both armature 6 and armature 8. A lower voltage will attract only armature 6. In the normal position of the armatures, a circuit exists from central reading station over the long line 4, through the coil of the magnet 2, armature 8, contacts 24 and 25, armature 6, contacts 20 and 21 to ground 5. When the higher voltage is applied sufficient current flows through the coil of the magnet 2 causing both armatures to be attracted. An auxiliary circuit is now established from the central reading station through long line 4, coil of the magnet 2, armature 8, contacts 23 and 22 to ground 5. Armature 6 in this position is inoperative. When a lower voltage is applied, the coil of the magnet 2 will pass less current and have only enough energy to attract armature 6. Contacts 18 and 19 touch each other and now a circuit exists from the central reading station, through the long line 4, the relay 2, armature 8, contacts 24 and 25, armature 6, contacts 19 and 18, switch arm 17, contact 12, cyclometer 14, part or all of the resistor 3 to ground 5. All other factors are the same as in the method explained under Fig. 1.

What is claimed is:

1. In an apparatus for indicating at a remote point the relative position of a movable member, a plurality of resistances the values of which are correlated with different positions capable of being assumed by said member, an electric circuit including an indicator at said remote point, a stepping switch operable upon indexing thereof to sequentially connect said resistances in the circuit, an indexing solenoid for said switch including a coil disposed in said circuit, an armature for said solenoid capable of being attracted by application of current of a predetermined characteristic only to said circuit, means connecting the armature and switch for operative indexing of the latter upon attraction of said armature to the coil, a second armature for said solenoid capable of being attracted by application of current of a different characteristic to said coil, means operable when said latter armature becomes attracted and said former armature remains unattracted for connecting said stepping switch and its potentially connected resistances in the circuit, and means at said remote point for selectively connecting said indicator in the circuit while simultaneously applying current of said different characteristic to the circuit for reading purposes and for disconnecting said indicator from the circuit while simultaneously applying current of said predetermined characteristic to the circuit for indexing purposes.

2. In an apparatus for indicating at a remote point the relative position of a movable member, a plurality of resistances the values of which are correlated with different positions capable of being assumed by said member, an electric circuit including an indicator at said remote point, a stepping switch operable upon indexing thereof to sequentially connect said resistances in the circuit, an indexing solenoid for said switch including a coil disposed in said circuit, an armature for said solenoid capable of being attracted by application of current of relatively high voltage only to said coil, means connecting the armature and switch for operative indexing of the latter upon attraction of said armature to the coil, a second armature for said solenoid capable of being attracted by application of current of a relatively low voltage to said coil, means operable when said latter armature becomes attracted and said former armature remains unattracted for connecting said stepping switch and its potentially connected resistances in the circuit and means at said remote point for selectively connecting said indicator in the circuit while simultaneously applying current of relatively low voltage to the circuit for reading purposes and for disconnecting said indicator from the circuit while simultaneously connecting a source of relatively high voltage to the circuit for indexing purposes.

WARD LEATHERS.